United States Patent [19]

Csabafy

[11] Patent Number: 5,211,701
[45] Date of Patent: May 18, 1993

[54] RAPID CHANGE DRILL BIT SYSTEM

[76] Inventor: Attila Csabafy, 32486 Galleon Way, San Juan Capistrano, Calif. 92675

[21] Appl. No.: 818,521

[22] Filed: Jan. 9, 1992

[51] Int. Cl.$^5$ ............................................ B23B 31/103
[52] U.S. Cl. ................................. 408/239 R; 279/79; 403/330
[58] Field of Search ............... 408/239 R, 239 A, 240, 408/231; 279/23.1, 24, 79, 89, 906; 403/326, 327, 328, 330

[56] References Cited

U.S. PATENT DOCUMENTS

| | | | |
|---|---|---|---|
| 943,863 | 12/1909 | Clouse | 279/79 |
| 2,734,413 | 2/1959 | Dunkelberger | 279/24 |
| 2,888,050 | 5/1959 | Einhiple | 279/79 |
| 4,605,348 | 8/1986 | DeCaro | 279/79 |
| 4,995,768 | 2/1991 | Craft | 408/239 A |
| 5,049,013 | 9/1991 | Engles et al. | 279/89 |

Primary Examiner—Daniel W. Howell
Attorney, Agent, or Firm—Frank C. Price

[57] ABSTRACT

An exchangeable-size tool system uses a tool holder which can reside in a drive motor chuck. Each of the various sizes or type of tool has the same shank size for mounting within the holder. A given tool size is popped into the holder. It is removed by manually pressing a small locking pin on the side of the holder and then pulling out the shank. The important features of the system are the ease of manufacturing and the precision of the holding of the tool.

2 Claims, 1 Drawing Sheet

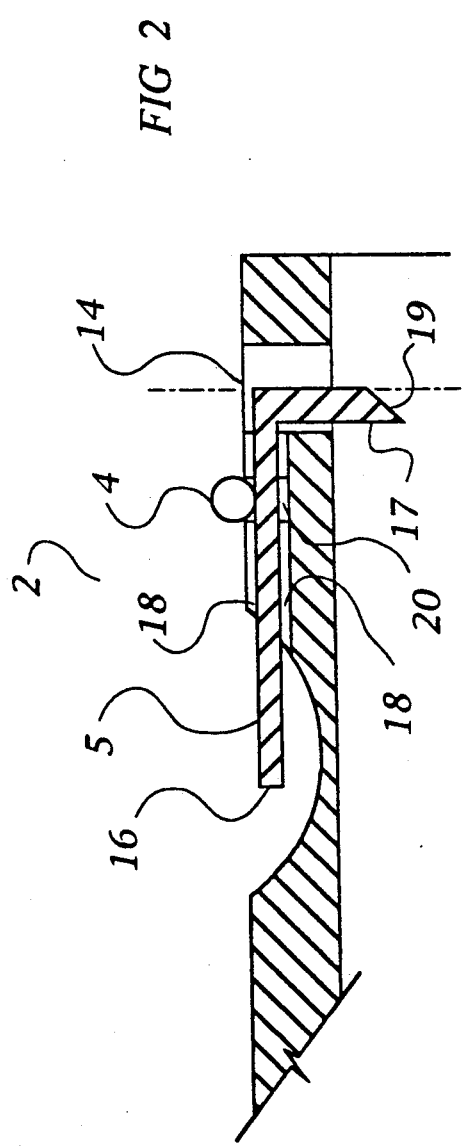
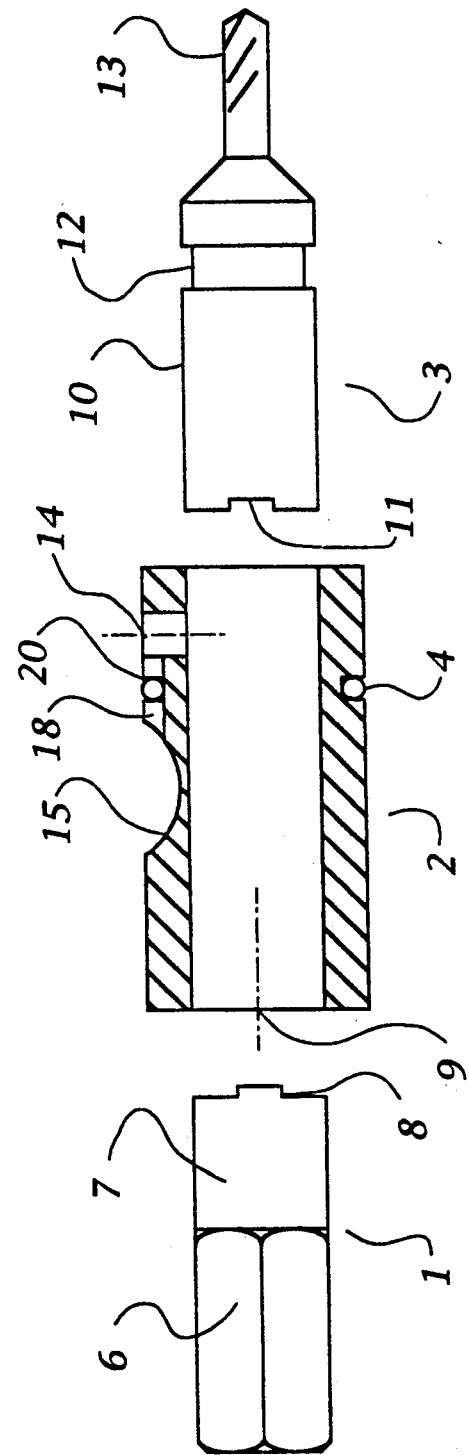

5,211,701

RAPID CHANGE DRILL BIT SYSTEM

FIELD OF THE INVENTION

A system for rapidly changing the drill bit size for a drill motor can have many useful applications. Also, other types of tools with exchangeable implement sizes for screw driving and nut driving are convenient and are commercially successful both in industrial applications and in home tools. The field of this invention includes any temporary connection system for tools or implements which is faster or more convenient than a threaded connection or the classical chuck which comprises multiple jaw elements which move toward the axis of the system when driven by a rotated enclosure which is tapered to force the jaws together.

The important characteristics of a drill bit holder are the cost to produce it, the convenience of its use and its performance—holding ability. If a holder of good performance is too costly or not very convenient, then it might not be commercially viable. Thus, the field of this invention is commercially viable, convenient, interchangeable tool bits which operate with precision.

SUMMARY OF THE INVENTION

The present invention involves a set of drill bits, nut drivers, screw driver tips or other variously sized tools all with a common shank size. The shank snaps into a holder. The shank is removable from the holder once a small lever on the side of the holder is pressed with the thumb or finger. The holder preferably has a hexagonal shape to its end opposite the tool shank insertment. This enhances the grip of a chuck of a drill motor or manual driver where the holder is installed. Various sizes or types of tool which are mounted in the holder are exchanged to meet the demands of the job. The case of an assortment of drill bit sizes is typical for this concept.

The drill bit holder includes a hollow cylinder with a pressed-fit insert partially filling the inside of the cylinder from one end. The uninserted end of the insert has an hexagonal shape for being held in a chuck. The other end, the inside end of the insert, is ground or milled off to form a ridge across the diameter of the end of the insert. This ridge matches precisely a groove on the end of the shank of each drill bit which bottoms against it from the other end of the hollow cylinder. The shank of a given drill bit is sized for a close fit to the inside diameter of the holder. The shank is inserted into the holder, at the end opposite to where the pressed-fit insert resides, until its end groove fits onto the ridge of the pressed-fit insert at the bottom of the cylindrical hole in the holder. The rotational lock provided by this ridge and groove allows the transmission of torque from the holder to the drill bit.

Each drill bit shank has a periferal groove located near the end along its portion which becomes encompassed within the holder. The holder has held against its side, within a straight groove along the surface of the holder, a levering right angle locking pin, one leg of which protrudes through a hole in the side of the holder, the hole being located in line with the periferal groove of the inserted drill bit shank. The end of the protruding leg, seating within the periferal groove of the shank, holds the shank from being pulled out of the holder. The other (outer) leg of the levering locking pin extends along the outer portion of the holder within a straight groove in the holder and is held there in the shank-locking position by an "O" ring which fits around the outside of the holder in an "O" ring groove. Beneath the end of the outer leg of the locking pin a depression is milled out of the holder to provide space for the leg to be pressed down. This motion results in the inserted leg of the pin being lifted out of the groove in the drill bit shank thus allowing the shank to be removed from the holder by a manual tug. The holder entrance side of the end of the inserted leg of the locking pin is tapered to allow a drill bit shank to be fully inserted, raising the locking pin, and then to be held in place as the inserted leg drops into the groove in the shank. A drill bit is readily removed from the holder once the outer leg of the locking pin is pressed by a finger or thumb.

The present invention of a rapid change drill bit system can be almost entirely fabricated by mass production methods using lathes and grinders or mills. The system is made of mostly circular shapes and grooves. Even the non-circular shapes are readily formed. Each different size of bit has the same diameter base or shank which precisely fits into the holder.

There are other systems for rapid change of screw driver blades or of nut drivers wherein the driver bit is held in place magnetically. This works where the action with the tool is always with compression between the holder and the bit. Where there is tension as with the backing out of a drill bit from its produced hole, the magnetic holding is not reliable. There are tools with loose-fitting hexagonal matchings between driver and tool, male/female. However, only sloppy fits, not suitable for holding a drill bit, have been arranged because of the great expense of machining a precise hexagonal hole.

For over forty years there has been available the "Yankee" screw driver with interchangeable bits of various sizes. The base end of the shank of each bit is ground off to form a half-moon shape which matches with another shape within the chuck of the tool. However, the "Yankee" grips its bit by means of a twisted or screwed collar much like the action of a chuck. This is an inconvenience compared to the present invention.

DESCRIPTION OF THE DRAWINGS

FIG. 1 shows an exploded view of four of the five parts of the invention. The locking pin is omitted for clarity. The pin itself is shown in the cross sectional view, FIG. 2.

FIG. 2 is a cross-sectional view of a portion of the holder including the locking pin and its "O" ring retainer.

DESCRIPTION OF THE PREFERRED EMBODIMENT

FIG. 1 shows the parts of the invention individually beginning with the torque locking piece 1 which is installed with a press fit inside one end of the holder 2. The drill bit 3 is installed inside the opposite end of holder 2. The locking pin 5, seen in FIG. 2, retains drill bit 3 inside holder 2 as the "O" ring 4 compresses locking pin 5 within groove 12 in the shank 10 of drill bit 3. The shank 10 of drill bit 3 is sized for a precision slip fit within holder 2. The slot 11 of bit 3 accepts the ridge 8 of locking piece 1. Thus, the drill bit 3 cannot turn within holder 2 as the press-fitted locking piece 1 cannot turn within the holder 2. The locking piece 1 has an hexagonal shape on its external surface 6. This enhances non-slip holding of the system by a drill motor chuck where it resides semi-permanently as various sizes 13 of drill bit 3 are placed in the holder 2 as needed by a craftsman or mechanic.

In FIG. 2 is shown drill bit locking pin 5 with its thumb pressure-actuated end 16 and its locking end 17. Locking end 17 lies within peripheral groove 12 of drill bit 3, FIG. 1, to maintain the holding of drill bit 3 against extraction forces, especially as the drill bit is removed from its completed hole in the work. The one leg 16 of locking pin 5 lies within linear groove 18 in holder 2 and is held in place by "O" ring 4.

Holder 2 has a pocket 15 milled into its side. Pocket 15 is centered on groove 18. Locking pin 5 is actuated to rise in its hole 14 to allow bit 3 to be ejected from holder 2. The rising movement is created by thumb pressure at 16 which creates a rocking movement for the locking pin 5.

A complete description of holder 2 would be that it is a hollow cylinder with a circumferential external "O" ring groove 20, a milled depression 15, a hole 14 in its wall to accept the bit-retaining end of locking pin 5, a slot 18 connecting hole 14 and depression 15, the slot passing through groove 20, the slot accepting the longer, external leg 16 of locking pin 5, the depression providing room for motion of the longer leg 16 when actuation of pin 5 is manually executed for the removal of bit 3 from holder 2.

A complete description of locking pin 5 would be that it is a right angle shape with one leg 16 sitting inside groove 18 and extending into depression 15 in holder 2 where it moves for actuation to release bit 3. The other leg 17 is inserted through opening 14 to reach into groove 12 of bit 3. The end of leg 17 is tapered to allow deflection of leg 17 when the shank 10 of bit 3 is forced into holder 2. Locking pin 5 is held in place by "O" ring 4 pressing on leg 16.

Application of the invention is intended to incorporate one holder 2 with locking piece 1 fixed in place inserted within holder 2. These two joined parts would have an accompanying set of drill bit sizes 13 each shaped identically in the shank 10, 11, 12 for a match fit with holder 2. The drill bit size is readily changed by thumb pressure on locking pin 5 at the depression 15 location to push leg 16 against the holder 2 and thereby lift leg 17 out of groove 12 allowing removal of the installed bit 3. Another replacement bit 3 is quickly installed by insertion and rotation to make the match between groove 11 and protrusion 8 which then allows bit 3 to enter holder 2 far enough for pin 5 to snap into groove 12.

The preferred embodiment is only one example of the invention. There could be many variations on the shapes of the parts and the actuation of the retention pin stroke.

While the preferred embodiment shows a drill bit, the interchangeable piece could be a tool such as a screw driver, a nut driver or any tool such a soldering iron tip. With the latter, instead of an "O" ring, a coil spring could be used.

I claim:

1. A system of parts including various interchangeable sizes and shapes of one component part of the system, these interchangeable, functional component parts hereafter referred to as IFCP, comprising:

a holder for the IFCP, the holder containing a cavity to receive the IFCP, the cavity having a bottom surface, the surface having a raised portion on its surface across the width of the cavity, each IFCP having a functional portion and an installation portion, the shape of the installation portion being identical for all IFCP's, the installation portion fitting into the cavity portion of the holder, the IFCP containing a groove across its width on the end of its installation portion, the groove fitting exactly with the raised portion on the holder, the mating of the groove and raised portions preventing rotation between the holder and the IFCP, the mating providing a means of transmitting torque from the holder to the IFCP, the IFCP containing a peripheral groove, the peripheral groove being located on the IFCP so that said peripheral groove is immersed within the cavity of the holder when the IFCP and the holder are joined, the holder containing an opening on its side leading through its wall to the cavity, the opening located in line with the IFCP peripheral groove when the IFCP is joined to the holder, the holder having a depression in its outside surface centered in line with the opening on its side and displaced from said opening along the length of the holder away from where the IFCP enters the holder, the depression and the opening being connected by an open channel, the depth of the channel being less than the depth of the depression, the holder containing an "O" ring and "O" ring groove, the groove located between the opening and the depression, the holder being fitted within the channel on its exterior wall with a moveable locking pin, the pin being held in place within the groove by its lying under the "O" ring and perpendicular to it, the pin being "L" shaped, the long leg of the "L" being positioned within the groove and under the "O" ring, the short leg of the "L" protruding into the opening on the holder under pressure from the "O" ring to create the locking function holding the IFCP in the holder as the short leg resides within the peripheral groove on the IFCP, the short leg having a normal and an actuated position, the short leg in its normal position having its one end extend into the groove of the IFCP, the leg position within the groove preventing the IFCP from exiting the holder, actuation of the pin being effected by manually pressing the long leg of the pin downward into the depression on the side of the holder, the pin then rocking its long leg on the bottom of the groove between the opening for the short leg and the depression, and at the same time stretching the "O" ring, the pin in its actuated position having its protruding, short leg end outside the groove, the IFCP then being removable from the holder, the result being that the holder and any one of the set of individual, different items of the IFCP can readily be interchanged and joined.

2. A hingeless actuation pin as part of a larger device, the pin comprising:

a pin groove in the device, the pin groove holding the actuation pin, the pin having a rocking leg and an actuation leg, one end of the pin groove opening into a depression in the device, the depression being larger and deeper than the groove, the rocking leg of the pin extending over and ending over the location of the depression, an "O" ring groove in the surface of the device, the "O" ring groove running perpendicular to the pin groove, the "O" ring groove located along the rocking leg of the pin a distance away from the location of the depression, an "O" ring within the groove, the stretching force of the "O" ring functioning to hold the rocking leg of the pin in its non-actuation position, the result being that actuation pressure on the rocking leg of the pin at a point above the location of the depression results in a rocking action of the pin as its end located over the depression lowers into the depression and its end opposite to that over the depression rises against the "O" ring, either end of the pin having an actuation leg extending into or above the device, movement of the actuation leg being the means of transmitting the actuation action.

* * * * *